(12) United States Patent
Brück et al.

(10) Patent No.: US 7,765,697 B2
(45) Date of Patent: Aug. 3, 2010

(54) PROCESS FOR PRODUCING A HONEYCOMB BODY WITH A FLANGE PIECE FOR A MEASUREMENT SENSOR, AND CORRESPONDING HONEYCOMB BODY

(75) Inventors: Rolf Brück, Bergisch Gladbach (DE); Kait Althöfer, Wiehl (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 1567 days.

(21) Appl. No.: 10/931,425

(22) Filed: Sep. 1, 2004

(65) Prior Publication Data

US 2005/0022382 A1 Feb. 3, 2005

Related U.S. Application Data

(63) Continuation of application No. PCT/EP03/01801, filed on Feb. 21, 2003.

(30) Foreign Application Priority Data

Mar. 1, 2002 (DE) ................................ 102 08 872

(51) Int. Cl.
*B21D 51/16* (2006.01)
(52) U.S. Cl. ........................ 29/890; 29/451; 29/455.1
(58) Field of Classification Search .................. 29/890, 29/513, 451, 455.1; 422/179, 180; 110/190, 110/349
See application file for complete search history.

(56) References Cited

U.S. PATENT DOCUMENTS 4,163,042 A * 7/1979 Lynch ......................... 422/179
4,259,771 A * 4/1981 Ogata et al. .................. 29/33 F
4,795,615 A * 1/1989 Cyron et al. ................. 422/179

5,071,174 A 12/1991 Griffin et al.

(Continued)

FOREIGN PATENT DOCUMENTS

DE 31 16 967 A1 11/1982

(Continued)

OTHER PUBLICATIONS

Japanese Office Action dated Nov. 27, 2008.

*Primary Examiner*—Rick K Chang
(74) *Attorney, Agent, or Firm*—Laurence A. Greenberg; Werner H. Stemer; Ralph E. Locher

(57) ABSTRACT

A process for producing a honeycomb body includes a) producing a tubular casing from sheet metal; b) introducing a hole, delimited by a rim, into the sheet metal; c) fitting a flange piece for a measurement sensor to the hole rim; d) introducing a honeycomb structure into the tubular casing; and e) joining the tubular casing to the honeycomb structure and the flange piece by brazing or welding in a single, common, heat treatment process. Steps a), b) and c) are carried out in any desired order. A honeycomb body includes a honeycomb structure. A tubular casing surrounds the honeycomb structure, has a hole delimited by a rim, and has a necked region surrounding the hole. A flange piece for a measurement sensor is brazed to the hole rim. The process allows a flange piece to be connected to the tubular casing in an advantageous manner as part of an on-going heat treatment process, resulting in a simple and fast production and consequently a reduction of costs.

10 Claims, 4 Drawing Sheets

U.S. PATENT DOCUMENTS

| | | | |
|---|---|---|---|
| 5,280,971 A | 1/1994 | Tokutake et al. | |
| 5,553,553 A * | 9/1996 | Hoeffken | 110/190 |
| 5,768,889 A * | 6/1998 | Maus et al. | 60/300 |
| 7,111,393 B2 * | 9/2006 | Bruck | 29/890 |
| 2004/0009106 A1 | 1/2004 | Galligan et al. | |
| 2004/0074094 A1 | 4/2004 | Bruck | |

FOREIGN PATENT DOCUMENTS

| | | |
|---|---|---|
| DE | 88 16 154.4 U1 | 3/1989 |
| DE | 197 35 247 C1 | 1/1999 |
| DE | 101 12 678 A1 | 10/2002 |
| EP | 1 158 145 A2 | 11/2001 |
| JP | 2001342826 A | 12/2001 |
| WO | 9956853 A1 | 11/1999 |

* cited by examiner

PROCESS FOR PRODUCING A HONEYCOMB BODY WITH A FLANGE PIECE FOR A MEASUREMENT SENSOR, AND CORRESPONDING HONEYCOMB BODY

CROSS-REFERENCE TO RELATED APPLICATION

This application is a continuation, under 35 U.S.C. §120, of copending International Application No. PCT/EP03/01801, filed Feb. 21, 2003, which designated the United States; this application also claims the priority, under 35 U.S.C. §119, of German Patent Application 102 08 872.1, filed Mar. 1, 2002; the prior applications are herewith incorporated by reference in their entirety.

BACKGROUND OF THE INVENTION

Field of the Invention

The invention relates to a process for producing a honeycomb body having a honeycomb structure, a tubular casing and a flange piece for a measurement sensor. The invention also relates to a honeycomb body having a flange piece for a measurement sensor.

Honeycomb bodies are in widespread use in the automotive industry as catalyst carrier bodies forming part of a system for the catalytic conversion of combustion exhaust gas from an internal combustion engine. In view of the ever increasing stringency of statutory limits for permissible pollutant concentrations in the exhaust gas from an internal combustion engine which is emitted to the environment, it is necessary to use exhaust-gas purification systems which adapt their operating behavior as a function of, for example, the composition of the exhaust gas. That is generally effected by using a controlled exhaust-gas purification system which, for example in the region of the catalyst carrier bodies, has a measurement sensor, the signals from which are used to control the exhaust-gas purification system.

Heretofore, various additional working steps have been required to produce a honeycomb body of that type with the possibility of securing a measurement sensor to the honeycomb body. For example, after a hole had been formed in a tubular casing of the honeycomb body, a flange piece was fitted and then had to be joined, in particular welded, to the tubular casing in an additional working step. That entailed additional costs for production of honeycomb bodies of that type.

SUMMARY OF THE INVENTION

It is accordingly an object of the invention to provide a process for producing a honeycomb body with a flange piece for a measurement sensor, and a corresponding honeycomb body, which overcome the hereinafore-mentioned disadvantages of the heretofore-known processes and products of this general type and which make do with the minimum possible number of working steps and low costs.

With the foregoing and other objects in view there is provided, in accordance with the invention, a process for producing a honeycomb body. The process comprises: a) producing a tubular casing from sheet metal; b) introducing a hole, delimited by a rim, into the sheet metal of the tubular casing at a predetermined location; c) fitting a flange piece for a measurement sensor to the hole rim in the tubular casing; d) introducing a honeycomb structure into the tubular casing; and e) joining the tubular casing to the honeycomb structure and the flange piece by brazing or welding in a single, common, heat treatment process. The steps a), b) and c) may be carried out in any desired order.

The process thus makes it possible to produce a honeycomb body with a flange piece for a measurement sensor in a single heat treatment process. In the common heat treatment process, the sheet-metal layers of the honeycomb structure are joined to the tubular casing, the flange piece is joined to the tubular casing and, if appropriate, the sheet-metal layers of the honeycomb structure are joined to one another. This eliminates a further processing step in which the flange piece is joined to the tubular casing.

In the context of the invention, it makes no difference whether the order given for steps a) to c) is maintained or whether parts of the process are carried out in a different order. For example, it is equally advantageous and within the scope of the invention for a hole which is delimited by a rim to be formed in the sheet metal before the sheet metal is deformed to form a tubular casing.

In accordance with another mode of the invention, the hole rim and the flange piece are configured in such a way that they remain together before and during the heat treatment process. This can be achieved, for example, by the hole rim being shaped in such a way that it forms a resilient or latching connection to the flange piece. This ensures that the flange piece is held on the tubular casing by the spring force or latching action. This is advantageous in particular if the honeycomb body is heat-treated in an upright position.

Various other measures, individually or in combination, can also be used advantageously to help hold the tubular casing and the flange piece together during the subsequent handling steps and during the heat treatment prior to final joining. For example, at least one spot weld when the flange piece is being fitted represents a simple and effective measure for pre-fixing. The attachment of an assembly clip, in particular a reusable assembly clip, is also advantageous.

In accordance with a further, particularly preferred, mode of the invention, the heat treatment process is a brazing process. Brazing is one of the most widespread heat treatment processes used for the production of a honeycomb body, and consequently it is particularly inexpensive and appropriate in manufacturing technology terms for the flange piece also to be joined to the tubular casing in an existing brazing process. According to the invention, a single brazing process is sufficient to join the flange piece to the tubular casing and to join the honeycomb structure to the tubular casing, and if appropriate, also to join the sheet-metal layers of the honeycomb structure to one another.

In accordance with an added mode of the invention, brazing material is applied to the hole rim and/or the flange piece before or after the flange piece is fitted to the hole rim. This allows a highly flexible procedure to be used, in particular for the application of brazing material to the flange piece and/or the hole rim to be taken into account in existing process steps.

In accordance with an additional mode of the invention, the brazing material is applied as brazing powder, brazing paste or brazing foil, preferably brazing powder or brazing foil, particularly preferably brazing powder. Depending on the structure of the flange piece and/or the hole rim, it is possible to individually select the form of brazing material which is most suitable in this situation for application of brazing material to the hole rim and/or the flange piece. This also results in a wide range of options in combining the type of brazing material with the instant at which the brazing material is applied. If appropriate, yet another step, such as the application of a layer of glue and/or a passivation layer to one of the two components, may also have to be taken into account when using, for example, brazing powder. Depending on the way in which the hole is produced, it may also be necessary to first of all machine the hole rim in order to prepare it for the further steps. This machining may in particular involve deburring, smoothing or surface treatment in order to improve the brazing operation.

In accordance with yet another mode of the invention, the honeycomb structure has a free volume for receiving the measurement sensor. This allows direct production of a honeycomb body in which the measurement sensor is integrated. In this case, the flange piece and free volume in the interior of the honeycomb body correspond in such a way that the measurement sensor is introduced into the honeycomb body through the flange piece. The measurement sensor is joined to the flange piece, for example, by screw connection or clamping, and then projects into the honeycomb structure.

In accordance with yet a further mode of the invention, the hole is introduced into the tubular casing through a necked formation. This makes it possible to form a resilient connection between the flange piece and the tubular casing without the need for a further working step, since the bent-up ends of the necked formation act as spring elements. This advantageously prevents the possibility of the flange piece and the tubular casing becoming disconnected from one another prior to joining, for example, by brazing or welding. The structure of the necked formation therefore prevents the flange piece from dropping off the tubular casing. This is also ensured if the honeycomb body is transported and/or brazed in an upright position.

In accordance with yet an added mode of the invention, the flange piece is fitted over the necked formation and then joined to it. The spring force of the bent-up ends of the necked formation fixes the flange piece as a result of the force acting from the inside outward.

In accordance with yet an additional mode of the invention, the flange piece is fitted into the necked formation and then joined to it. In this case, the spring force of the bent-up ends of the necked formation acts from the outside inward. A configuration of this type also allows the flange piece to be fixed to the tubular casing given a suitable structure of the flange piece.

With the objects of the invention in view, there is also provided a honeycomb body. The honeycomb body comprises a honeycomb structure. A tubular casing surrounds the honeycomb structure. The tubular casing has a hole delimited by a rim and a necked region surrounding the hole. A flange piece, which is provided for a measurement sensor, is brazed to the hole rim.

A honeycomb body of this type can be produced at low cost and advantageously enables a measurement sensor to be joined to the tubular casing by joining the measurement sensor to the flange piece secured to the tubular casing.

In accordance with a concomitant feature of the invention, the flange piece is engaged at least partially around or into the necked region in the manner of a plug connection, since this facilitates production and accurate positioning. A honeycomb body of this type may advantageously be provided with a measurement sensor and used in the exhaust system of an internal combustion engine, for example of an automobile.

Other features which are considered as characteristic for the invention are set forth in the appended claims, in which the process steps and product features may be employed individually or in various combinations.

Although the invention is illustrated and described herein as embodied in a process for producing a honeycomb body with a flange piece for a measurement sensor, and a corresponding honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
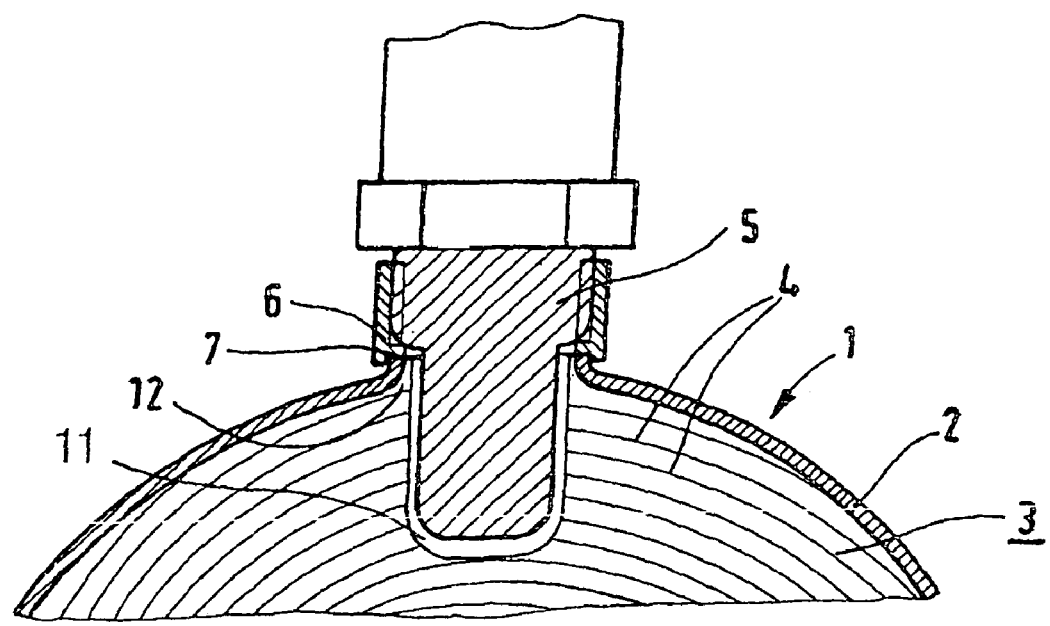
FIG. 1 is a fragmentary, diagrammatic, cross-sectional view of a first exemplary embodiment of a honeycomb body according to the invention.

Referring now to the figures of the drawings in detail and first, particularly, to FIG. 1 thereof, there is seen a honeycomb body 1, which includes a tubular casing 2 and a honeycomb structure 3. The honeycomb structure 3 includes sheet-metal layers 4, which are at least partially structured in such a way as to form a volume through which a fluid can flow. For the sake of clarity, the structures of the sheet-metal layers 4 have been omitted in the drawing. A measurement sensor 5, which is fixed in a flange piece 6, is introduced into the honeycomb body 1. The flange piece 6 is joined to a rim 7 of a hole 12 which has been introduced into the tubular casing 2. The honeycomb structure 3 has a volume 11 which is free of sheet-metal layers 4 and serves to receive the measurement sensor 5.

Figure 5:
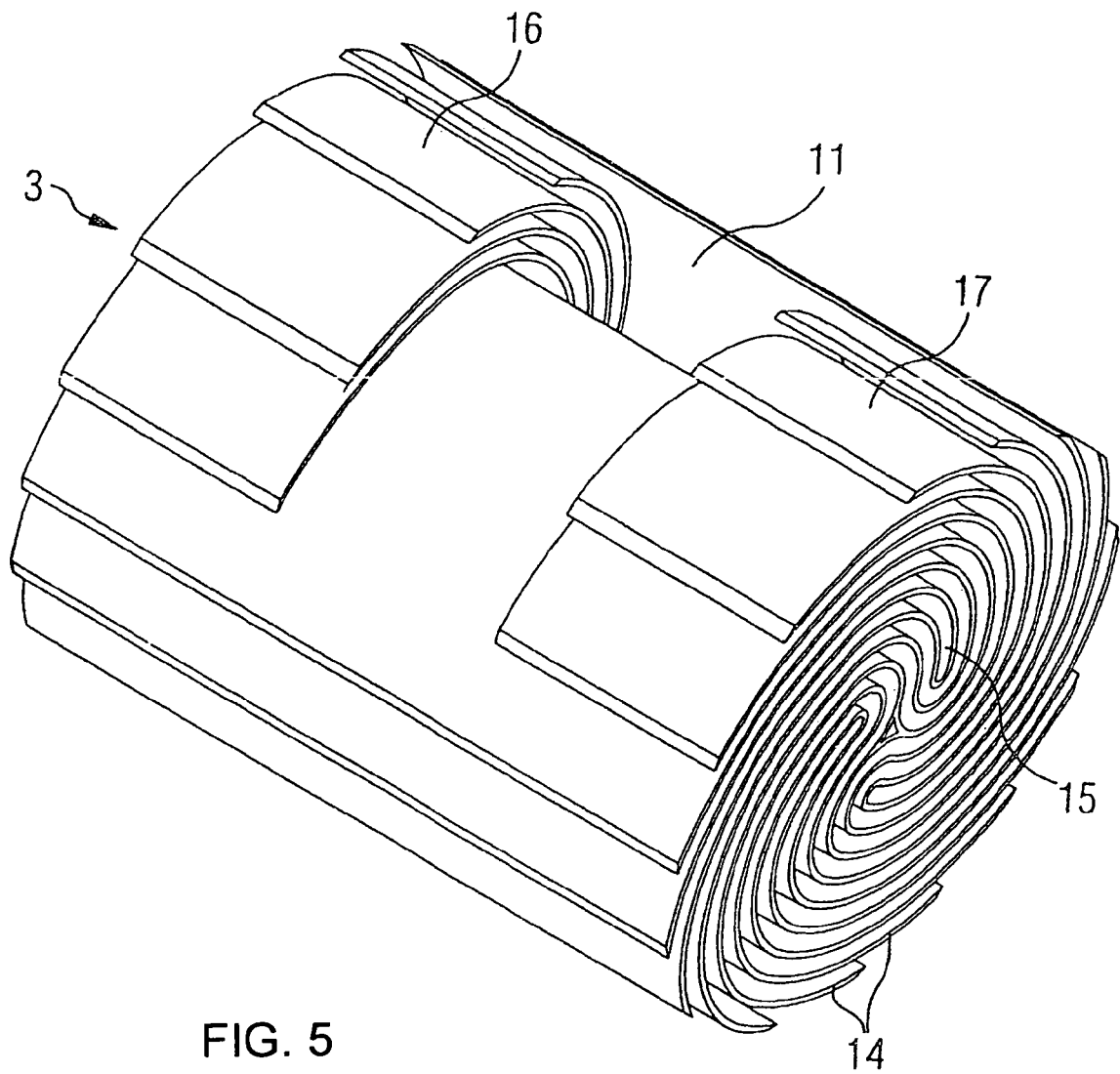
FIG. 5 is a perspective view of an example of a formation of a free volume for receiving a measurement sensor.

The free volume 11 can be produced in various ways, for example the holes may be introduced before or after stacking or winding, using all known cutting techniques, for example cavity sinking, laser cutting, water jet cutting or the like. Moreover, it is also possible, when constructing the honeycomb structure 3 from different stacks, to axially part at least one of these stacks. FIG. 5 shows an example of this. The honeycomb structure 3 is constructed by intertwining three stacks, which are each constructed from a plurality of alternately stacked smooth sheet-metal layers 14 and corrugated sheet-metal layers. For the sake of clarity, only the smooth sheet-metal layers 14 are shown in FIG. 5. In the present example, the honeycomb structure 3 includes three stacks which are uniformly intertwined with one another. One stack 15 is divided in the axial direction into a first partial stack 16 and a second partial stack 17, which are axially spaced apart from one another, thereby producing a free volume 11 which serves to receive a measurement sensor that is not shown in FIG. 5. In this way, it is readily possible to create a free volume 11 without, for example, a further machining step having to be carried out after the sheet-metal stacks have been intertwined.

Figure 2A:
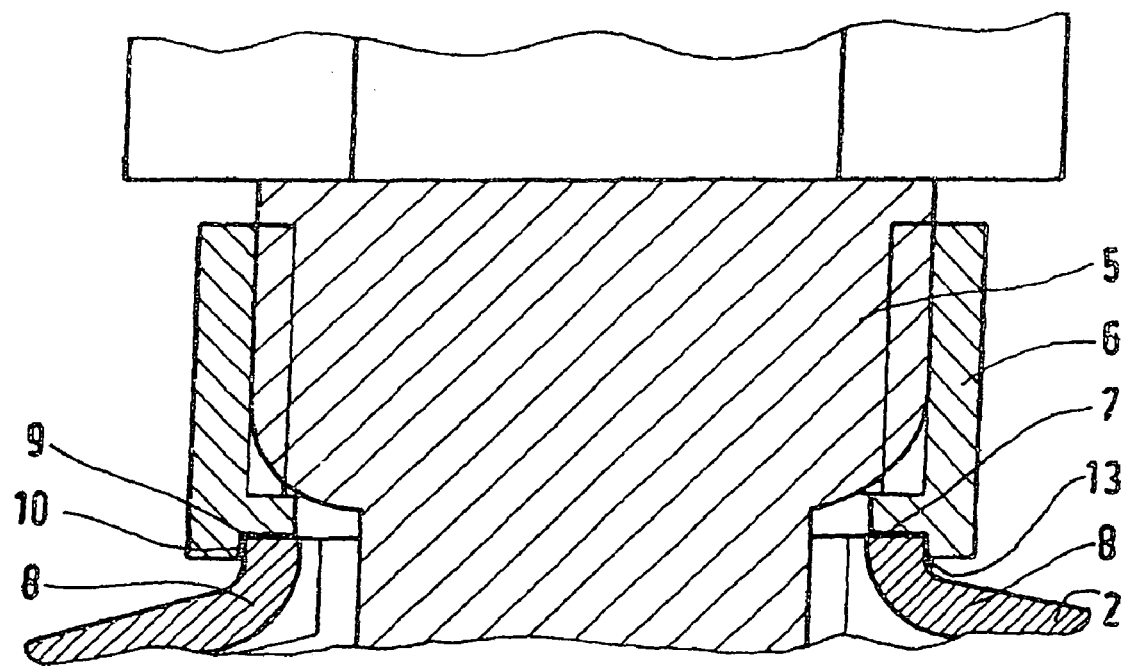
FIGS. 2A and 2B are enlarged, fragmentary, cross-sectional views of two embodiments of a flange piece according to the invention joined to a tubular casing.
Figure 2B:
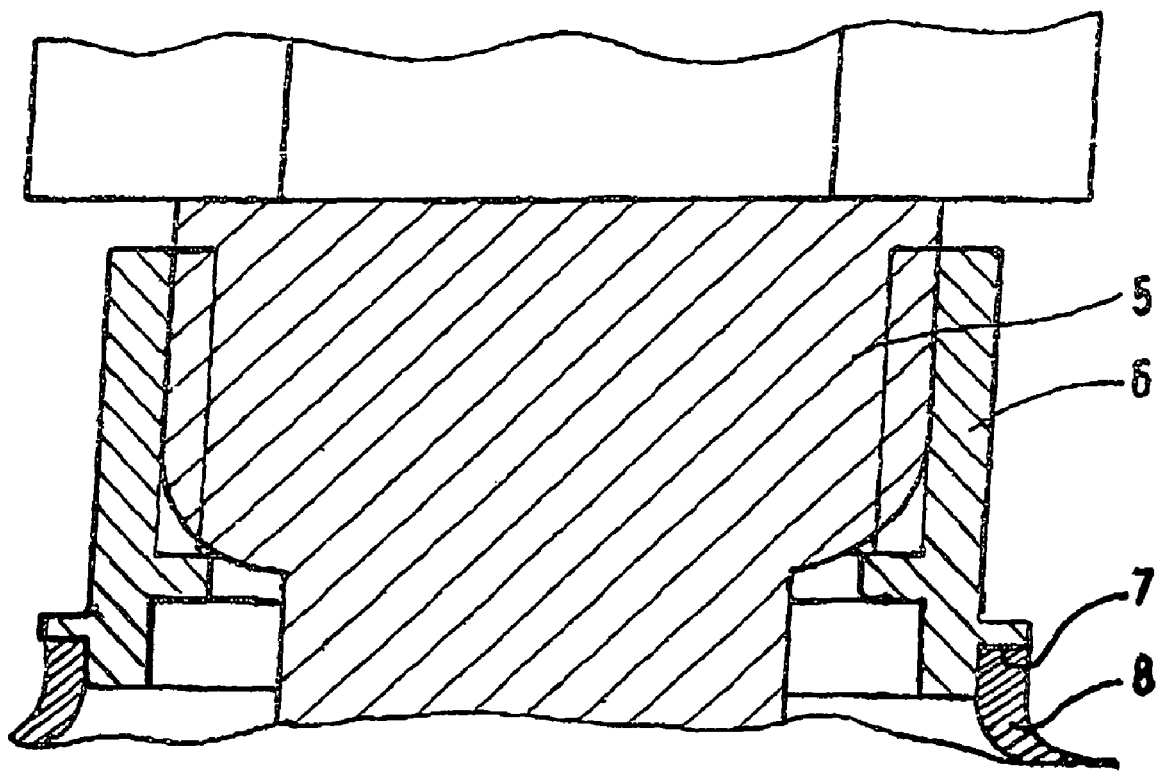

FIG. 2A shows an enlarged portion of FIG. 1, illustrating details of the way in which the flange piece 6 is joined to the hole rim 7. The hole 12 is formed by a necked-out or opened region 8, in which the tubular casing 2 is necked. The flange piece 6 is fitted over this necked region 8. Any further machining which may be required, in particular deburring or smoothing of the hole rim 7, can take place before the flange piece 6 is fitted on. The embodiment of FIG. 2B differs from that of FIG. 2A in that the flange piece 6 is placed inside the necked region 8.

The ends of the necked region 8 act as spring elements which fix the correspondingly shaped flange piece 6 before and during a heat treatment process, preferably a brazing process. The honeycomb body 1 which has been provided with the flange piece 6 fixed to the necked region 8 in this way can therefore, for example, be transported and stored between the production steps of fitting on the flange piece 6 and carrying out the brazing process without the flange piece 6 becoming detached from the tubular casing 2 or changing its position with respect to the tubular casing 2. The brazing may also be carried out in an upright position, i.e. with the flange piece 6 protruding sideways, without the position of the flange piece 6 changing relative to the tubular casing 2. This ensures a good brazed join between the flange piece 6 and the hole rim 7 in the tubular casing 2, even in the event of vertical brazing. If necessary for manufacturing technology reasons, it is also possible for the flange piece 6 to be pre-fixed to the tubular casing 2, for example by a spot weld 13 or a mounting clip.

Brazing material 9 is applied to the hole rim 7 and/or a corresponding bearing surface 10 of the flange piece 6 before or after fitted-on the flange piece 6. The flange piece 6 is tightly joined to the hole rim 7 after a common brazing process. This brazing process is the same brazing process used to join the honeycomb structure 3 to the tubular casing 2. If appropriate, this process can also be used to join the sheet-metal layers 4 to one another to form the honeycomb structure 3. This eliminates a working step, which would be required without the process according to the invention, in order to secure the flange piece 6 to the hole rim 7. This accelerates the production process and leads to cost savings in the mass production of honeycomb bodies 1 with flange pieces 6 for fixing a measurement sensor 5.

After the brazing process has ended, the measurement sensor 5 can be introduced into the flange piece 6. The measurement sensor 5 is joined to the flange piece 6 by suitable measures, for example in the form of a screw connection or a clamped connection. The measurement sensor 5 may, for example, be a lambda sensor or a hydrocarbon sensor (HC sensor).

Figure 3:
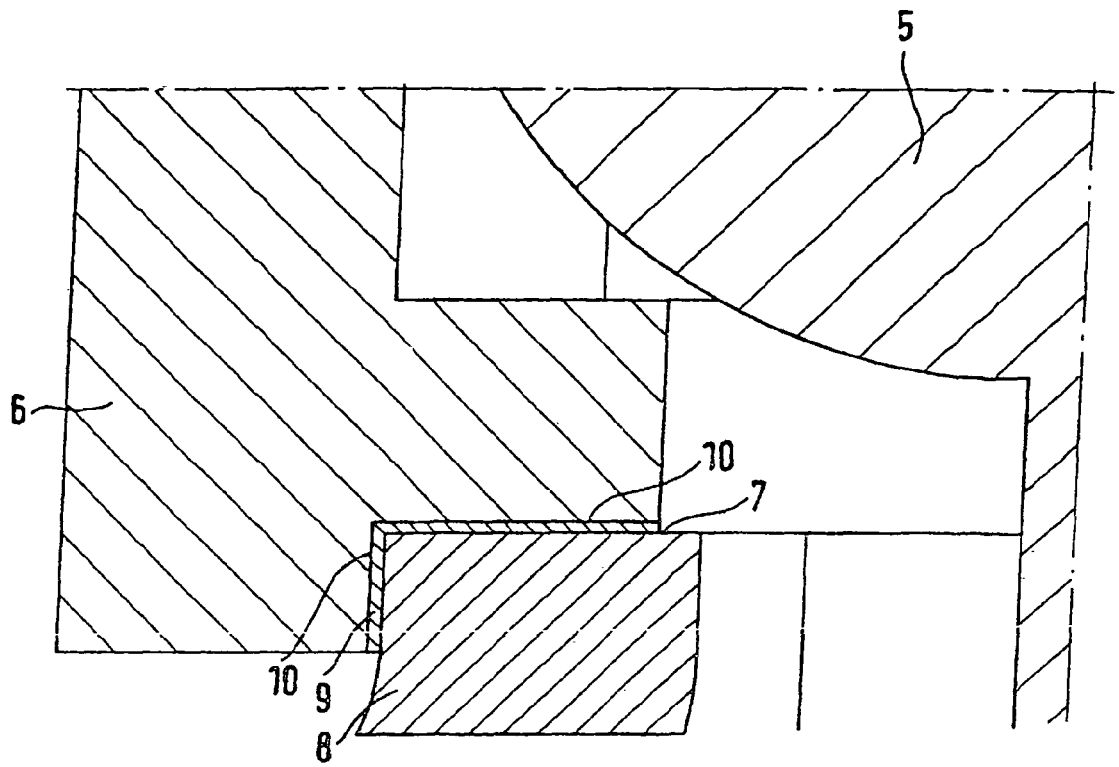
FIG. 3 is a further enlarged, fragmentary, cross-sectional view of a join between the flange piece and a hole rim.

FIG. 3 shows an even further enlarged portion of FIG. 2A. The figure reveals a layer of brazing material 9 between the hole rim 7 of the necked region 8 and the bearing surface 10 of the flange piece 6. After the brazing process, this layer of brazing material joins the flange piece 6 to the hole rim 7.

The brazing material 9 can be applied to the hole rim 7 and/or the bearing surface 10, preferably in the form of brazing powder, brazing foil or brazing paste, before or after the flange piece 6 is fitted onto the necked region 8. If appropriate, it is possible to apply a layer of glue or to form a passivation layer to prevent undesirable brazed joins in certain regions before the brazing material is applied.

Figure 4:
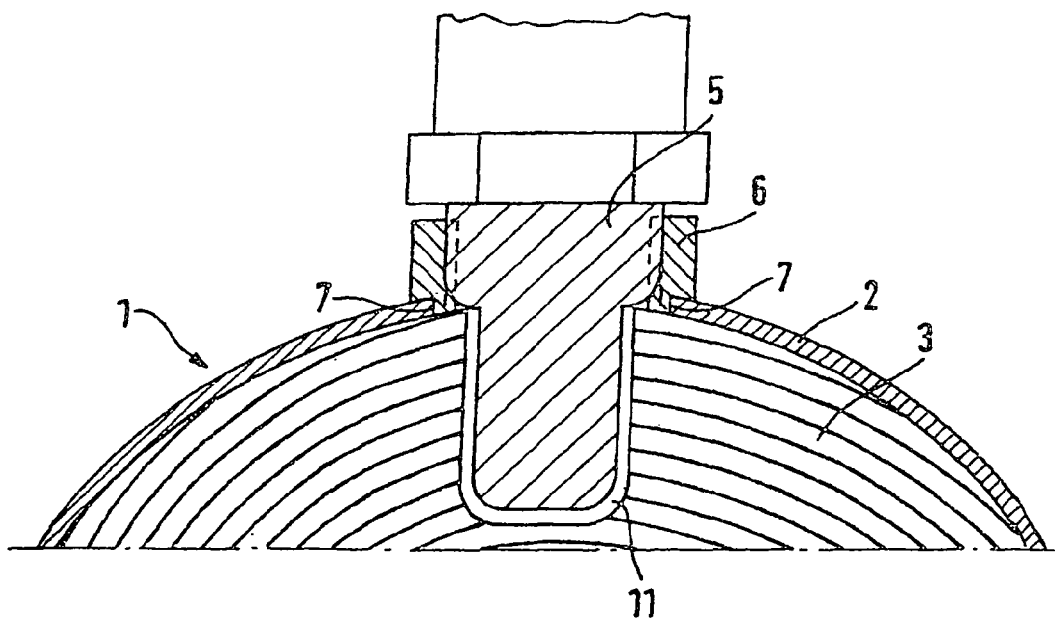
FIG. 4 is a view similar to FIG. 1 of a second exemplary embodiment of a honeycomb body according to the invention.

FIG. 4 shows a portion of a further exemplary embodiment of a honeycomb body 1 according to the invention. In this case, the hole 12 with the rim 7 has not been formed by a necked formation. The hole rim 7 or the corresponding bearing surface 10 (which is not specifically indicated in FIG. 4) of the flange piece 6 has been provided with brazing material 9. After a brazing process has been carried out, a join is formed between the flange piece 6 and the hole rim 7. The honeycomb structure 3 has a free volume 11, which is used to receive the measurement sensor 5. The measurement sensor 5 is joined to the flange piece 6 by suitable measures, for example in the form of a screw connection or clamping connection.

The process according to the invention simplifies the production of honeycomb bodies 1 having a tubular casing 2 which has a flange piece 6 for receiving a measurement sensor 5. The flange piece 6 is fixed to the tubular casing 2 before and during a heat treatment process, in such a way that the position of the flange piece 6 cannot change with respect to the tubular casing 2, with the result that a join is reliably formed between the flange piece 5 and the tubular casing 2.

We claim:

1. A process for producing a honeycomb body, which comprises the following steps:
   producing a tubular casing from sheet metal;
   introducing a hole, delimited by a rim, into the sheet metal of the tubular casing at a predetermined location;
   fitting a flange piece for a measurement sensor to the hole rim in the tubular casing;
   introducing a honeycomb structure into the tubular casing;
   joining the tubular casing to the honeycomb structure and the flange piece by brazing in a single, common, heat treatment process.

2. The process according to claim 1, which further comprises employing at least one additional measure to help hold the hole rim and the flange piece together during handling prior to a final joining process.

3. The process according to claim 2, wherein the at least one additional measure is spot welding.

4. The process according to claim 1, which further comprises carrying out the brazing process by applying brazing material to at least one of the hole rim and the flange piece before or after the flange piece is fitted to the hole rim.

5. The process according to claim 4, wherein the brazing material is selected from the group consisting of brazing powder, brazing paste and brazing foil.

6. The process according to claim 1, wherein the honeycomb structure has a free volume for receiving the measurement sensor.

7. The process according to claim 1, which further comprises carrying out the step of introducing the hole by providing a necked formation.

8. The process according to claim 7, which further comprises fitting the flange piece over the necked formation and then joining the flange piece to the necked formation.

9. The process according to claim 7, which further comprises fitting the flange piece into the necked formation and then joining the flange piece to the necked formation.

10. A process for producing a honeycomb body, which comprises the following steps:
    producing a tubular casing from sheet metal;
    introducing a hole, delimited by a rim, into the sheet metal of the tubular casing at a predetermined location;
    fitting a flange piece for a measurement sensor to the hole rim in the tubular casing;
    introducing a honeycomb structure into the tubular casing;
    joining the tubular casing to the honeycomb structure and the flange piece by brazing in a single, common, heat treatment process; and
    configuring the hole rim and the flange piece for keeping them together before and during the heat treatment process.

* * * * *